C. L. SAMP.
WAGON LOADER.
APPLICATION FILED JAN. 27, 1911.
1,016,038.
Patented Jan. 30, 1912.
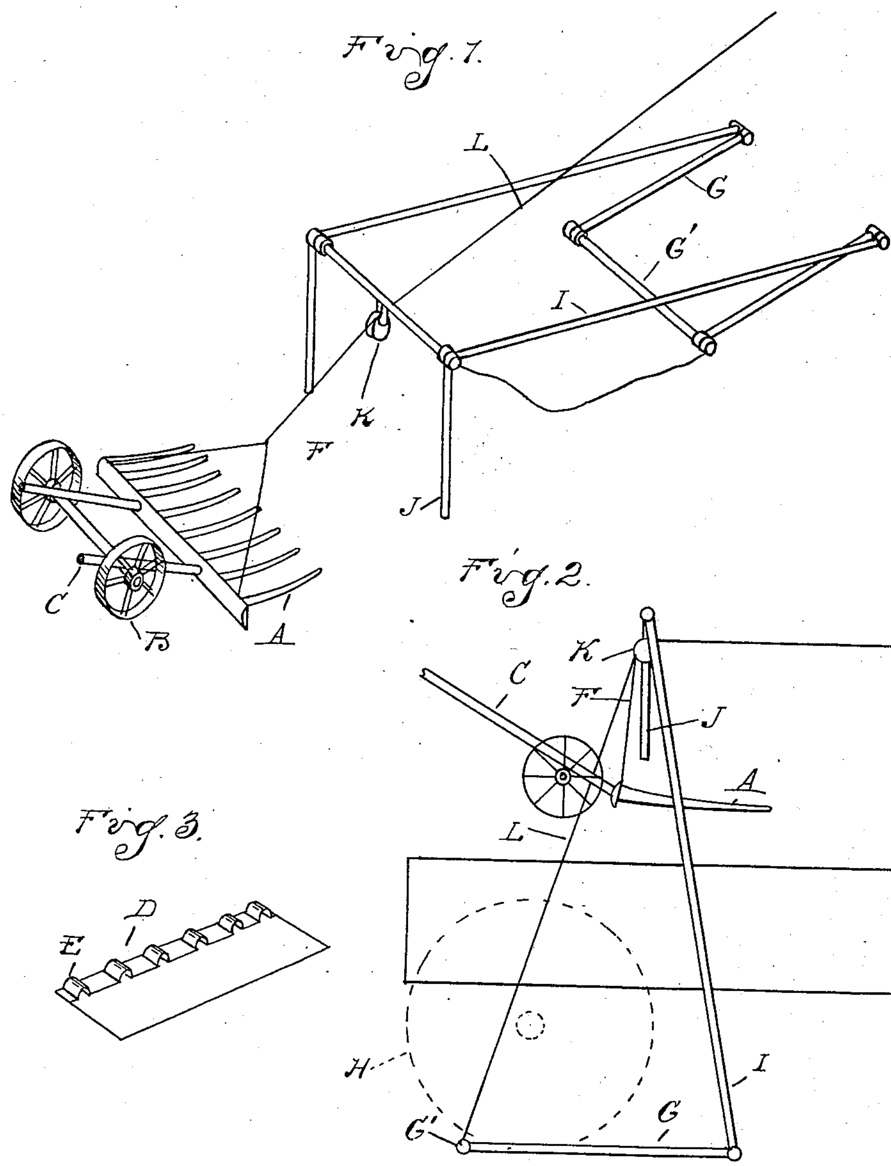
Witnesses
W. K. Ford
[signature]
Inventor
Charles. L. Samp
By Whittemore Hulbert & Whittemore
Attys

UNITED STATES PATENT OFFICE.

CHARLES L. SAMP, OF CHELSEA, MICHIGAN.

WAGON-LOADER.

1,016,038. Specification of Letters Patent. Patented Jan. 30, 1912.

Application filed January 27, 1911. Serial No. 605,044.

*To all whom it may concern:*

Be it known that I, Charles L. Samp, a citizen of the United States of America, residing at Chelsea, in the county of Washtenaw and State of Michigan, have invented certain new and useful Improvements in Wagon-Loaders, of which the following is a specification, reference being had therein to the accompanying drawings.

The invention relates to devices for loading wagons and is more particularly designed for use in the gathering and loading into wagons of manure and other refuse.

The invention consists in the peculiar construction, arrangement and combination of parts as hereinafter set forth.

In the drawings,—Figure 1 is a perspective view; Fig. 2 is a side elevation; Fig. 3 is a perspective view of a part of the device detached.

It is a particular object of the invention to obtain a construction which is readily applied to any ordinary wagon, and which utilizes the power of the team for gathering the load and hoisting the same into the wagon box. Essentially, the device comprises a gathering fork, scraper or other implement, and a frame independent of but applicable to the wagon carrying the sheave over which a hauling cable connected to the gathering implement is passed. The opposite end of the cable is attached to the draft-rigging of the team and then the gathering of the load and the hauling of the same to the wagon are easily accomplished. The frame applicable to the wagon is also provided with automatic means for lifting the load which operates by a continuation of the pull on the cable when the gathering implement has been drawn to the frame. This hoisting device includes a swinging member forming an element of the frame while the pivot or fulcrum for the swinging member is anchored by a member engaging the wheels of the wagon and held from movement thereby.

In detail A is the gathering implement which as shown is in the form of a fork having supporting wheels B and a guide handle C. This fork may, when desired, be converted into a scraper by the use of a scraper blade D having eyes E for engaging with the tines of the fork.

F is a hauling cable which is attached to the gathering device A and is of sufficient length to permit the range of movement of the implement A which is necessary.

G is a frame engageable with the wagon preferably of U-shaped form having the cross bar G′ arranged in rear of the wheels H of the wagon, and the parallel side members extending forward therefrom. I is a swinging frame fulcrumed or pivoted at the forward ends of the frame G and extending a sufficient distance rearward to be capable of swinging upward and clearing the wagon box. The frame I which also is preferably of U-shaped form is held normally in an inclined position by depending legs J, and a pulley or sheave K is connected centrally to the frame over which the hauling cable F is passed. The arrangement is such that where the direction of pull on the hauling cable is forward over the wagon box it will draw the gathering fork A to the frame I, and then by continuation of the pull will swing said frame upward carrying with it the implement A until the latter is above the wagon box in a position for dumping its load. To limit the swinging of the frame cables or chains L connect the frame G with the upper or outer end of the frame I and these will arrest movement before said frame has reached a vertical position. As a consequence, the frame is in the position to drop as soon as the tension on the cable is released.

The device constructed as described is simple and inexpensive to manufacture and is very useful in loading wagons, greatly decreasing the labor.

What I claim as my invention is:

1. The combination with a gathering implement, of a frame having a detachable anchoring engagement with the wagon to be loaded and adapted to swing upward over the wagon box, a sheave or pulley carried by said swinging frame, and a hauling cable passing over said sheave and attached to the gathering implement.

2. The combination with a gathering implement, of a swinging frame adapted to embrace and swing over the wagon box, a hauling cable for said gathering implement having a bearing on said swinging frame, and an anchor for the pivot of said swinging frame engaging and fixedly secured by the wheels of the wagon to be loaded.

3. The combination with a gathering implement, of a U-shaped frame adapted to embrace the wagon box, and to swing over the same, a second U-shaped frame to the forward ends of which the first frame is pivoted, said second frame having its cross bar arranged in rear of the wheels of the wagon, means for holding the swinging frame normally in inclined position and projecting in rear of the wagon box, and a hauling cable attached to said gathering implement and having a bearing on said swinging frame, for the purpose described.

4. The combination with a gathering implement, of a U-shaped frame having its cross bar engageable with the rear wheels of a wagon and its parallel arms extending forward therefrom, a second U-shaped frame of greater length having its parallel arms pivotally attached to the forward ends of the first U-shaped frame, legs for supporting said second frame normally in inclined position, a sheave carried by said second frame, and a hauling cable attached to said gathering implement and passing over said sheave, for the purpose described.

5. The combination with a slitted frame having guiding handles and a gathering fork, of a hauling cable attached to said frame, a U-shaped frame engageable with the rear wheels of a wagon and having its sides extending forward therefrom, a second U-shaped frame pivotally engaging the forwardly projecting sides of the first frame, legs upon said second frame for holding the same normally in inclined position, and a pulley on said second frame over which said hauling cable passes, for the purpose described.

6. The combination with a gathering implement, of a frame detachably engageable with the wheels of a wagon to be loaded, a second frame pivoted to said first frame and adapted to swing upward over the wagon box, a hauling cable attached to said gathering implement and having a bearing on said swinging frame for the purpose described.

7. The combination with a gathering implement, of a swinging frame having a detachable engagement with the wheels of the wagon to be loaded, a hauling cable attached to said gathering implement, and a bearing for said cable on said swinging frame.

In testimony whereof I affix my signature in presence of two witnesses.

CHARLES L. SAMP.

Witnesses:
P. G. SCHAIBLE,
ALBERT FAHRNER.

Copies of this patent may be obtained for five cents each, by addressing the "Commissioner of Patents, Washington, D. C."